United States Patent Office 3,732,073
Patented May 8, 1973

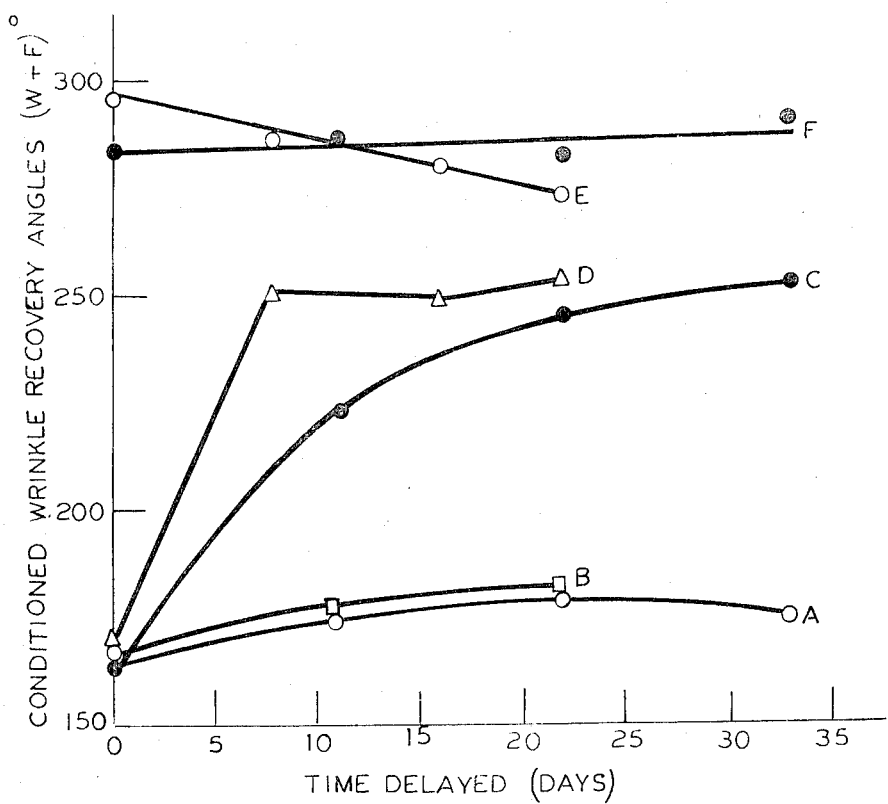

---

3,732,073
N,N-DIETHYLAZIRIDINIUM CHLORIDE AS A COREACTANT CATALYST FOR REACTIONS OF N-METHYLOL REAGENTS WITH CELLULOSE
Stanley P. Rowland, Earl J. Roberts, and Clinton P. Wade, New Orleans, La., assignors to the United States of America as represented by the Secretary of Agriculture
Filed Mar. 28, 1972, Ser. No. 238,869
Int. Cl. D06m 15/58, 15/56, 13/48
U.S. Cl. 8—183          9 Claims

ABSTRACT OF THE DISCLOSURE

N,N-diethylaziridinium chloride (DAC) is a coreactant catalyst for the reaction of cellulose with a broad variety of N-methylol compounds. This catalyst is effective in promoting reaction between cotton and individual N-methylol reagents or combinations of those reagents. The DAC was found especially effective as delayed-cure cross-linking processes. Little reaction occurred during delay periods up to 33 days and no increases in recovery angles were found in the delayed and uncured samples. The delayed-but-cured samples showed crease-recovery angles equal to those achieved in immediate cures.

---

A non-exclusive, irrevocable, royalty-free license in the invention herein described, throughout the world for all purposes of the United States Government, with the power to grant sublicenses for such purposes, is hereby granted to the Government of the United States of America.

Soignet et al. have employed diethylaminoethyl (DEAE) cotton as the substrate for reaction with alkyl halides, epoxides and anhydrides. The amine groups served as reaction and catalytic sites for these reactions. More recently, these authors have reported that salts of DEAE cotton serve as built-in catalysts for the reaction of dimethylolethyleneurea (DMEU) with cellulose. Starting with cotton fabric, this is a three-step process, requiring the preparation of the DEAE cotton, the conversion of the DEAE cotton to the desired salt, and the reaction of the DEAE-cotton-acid salt with DMEU.

We have found that DEAE-cotton can be prepared by pad-dry and pad-dry-cure processes; the reagent is N,N-diethylaziridinium chloride (DAC) and reaction conditions are similar to those employed in the finishing of cellulose with N-methylol compounds. This invention describes a process for the catalysis of reaction of N-methylol reagents with cellulose. In this case, DAC is a reagent which apparently reacts with cellulose and the resulting DEAE-cotton in the hydrochloride form serves as a catalyst in immediate-cure and delayed-cure processes of reaction of the N-methylol compounds.

While only examples of the preferred process of this invention are given the scope of this invention could include:

Amounts of N-methylol compounds and aziridinium compounds may vary over their range of solubilities in water. N-methylol compounds may be employed, also, in the form of methyl, etc. ethers.

A variety of homologs of N,N-diethylaziridinium chloride may be used.

The anion of the aziridinium compound may be any of the common anions of relatively strong acids including acetic acid.

The chloride is preferred.

Temperatures and times of cure may be varied from those in the examples.

The substrate for the reaction may be cotton cellulose in any form (fabric, yarn, fibers, decrystallized), wood fibers, rayon, polyvinyl alcohol (various forms plus film), and other polymers which contain an abundance of hydroxyl groups. The cellulosic fibers may be part of a blend with other natural or synthetic fibers.

The following examples illustrate but do not limit the scope of this invention. All percentages are by weight unless otherwise specified.

EXAMPLES 1–4

A series of reactions carried out with cotton fabric, N,N-diethylaziridinium chloride (DAC), and a variety of N-methylol derivatives in common usage. The results of these reactions are shown in Table I.

TABLE I
Effectiveness of N,N-diethylaziridinium chloride as a coreactant catalyst for various N-methylol reagents

| Example: | Reagent | Add-on (percent) | N (percent) | $CH_2O$ (percent) | Wrinkle (W+F), conditioned | Recovery degrees, wet | Tear strength (g.) |
|---|---|---|---|---|---|---|---|
|  | DMEU [2] | 6.1 | 2.01 | 2.97 | 296 | 276 | 515 |
| 1 | DMEU | 9.1 | 2.10 | 2.90 | 285 | 238 | 560 |
| 2 | DMDHEU | 4.2 | 1.05 | 1.30 | 224 | 223 | 727 |
| 3 | MMM | 10.0 | 3.37 | 2.24 | 277 | 265 | 580 |
| 4 | DMMC | 4.0 | 0.61 | 1.37 | 218 | 225 | 673 |
| Unmodified cotton control | | | | | 180 | 146 | 1,087 |

[1] The concentration of each N-methylol reagent in the aqueous pad-bath was 10%. The concentration of the N,N-diethylaziridinium chloride was 0.5 M (6.75%). The padded cotton fabrics were dried at 60° C. for 7 minutes or at room temperature for several hours and cured at 160° C. for 3 minutes.
[2] Catalyzed by commercial catalyst H-7 (zinc nitrate), 2% based on the weight of N-methylol reagent.

The DAC was more efficient as a catalyst for dimethylolethyleneurea (DMEU) than the commercial catalyst H-7 (zinc nitrate, 2% based on the DMEU) in the terms of add-on but was less effective under these conditions in terms of wrinkle recoveries. The conditioned and wet wrinkle-recovery angles were 296° and 276°, respectively, when the reaction was catalyzed by H-7 and 285° and 238°, respectively, when the reaction was catalyzed by DAC. The tear strengths of these samples were comparable.

The efficiency of DAC as a catalyst was high with trimethoxymethylmelamine (MMM), but the efficiencies were lower with dimethyloldihydroxyethyleneurea (DMDHEU)

and dimethylolmethyl carbamate (DMMC), which are generally less reactive than DMEU and MMM.

Increasing the curing time to 10 minutes at 160° C. increased the add-on DMDHEU to 9–10%; however, the crease-recovery angles were only 222–233°. Increasing the curing temperature to 180° C. for 3 minutes resulted in add-ons of approximately 10% add-on and wrinkle-recovery angles of 280–300° in DMDHEU fabric. Increasing the concentration of the DAC above 14% in the pad bath had little effect upon the add-on or wrinkle-recovery angles.

EXAMPLE 5

A swatch of printcloth was treated with two dips and two nips in an aqueous solution composed of 20% dimethylolethyleneurea (DMEU) and 13.6% N,N-diethylaziridinium chloride to a wet pickup of about 100%. The fabric was dried at 60° C. for 7 minutes and cured at 160° C. for 3 minutes. It was washed with hot water, then with cold water, and air-dried. The add-on was 22% and the nitrogen content was 3.9%. The wrinkle recovery angles were: conditioned 306° (W+F), wet 267°.

EXAMPLE 6

Cotton twill was padded into a solution consisting of 10% DMEU, 6.8% of DAC, and the remainder of water. The sample was cured at 150° C. for 15 minutes. After thorough washing, the dried fabric was found to have an add-on of 7.9%, conditioned wrinkle recovery angle of 280°, and wet wrinkle recovery angle of 248°.

EXAMPLE 7

Cotton broadcloth was padded into an aqueous solution composed of DMDHEU (8%) and DAC (14%). The fabric was dried at 50° C. for 10 minutes and cured for 6 minutes at 180° C. After laundering and drying, the fabric was found to have an add-on of 10%, conditioned wrinkle recovery angle of 290°, and wet wrinkle recovery angle of 274°.

EXAMPLE 8

An aqueous pad bath containing 10% of trimethylolmethylmelamine and 3.0% of DAC was used for the treatment of cotton printcloth, which was dried and then cured at 200° C. for 1 minute. The sample was laundered and tumble dried. The add-on of reagents was 11%; the conditioned wrinkle recovery angle was 280° and the wet wrinkle recovery angle was 260°.

EXAMPLE 9

The procedure was the same as that of Example 6 but the solution for treating the fabric was composed of 8% of dimethylolmethyl carbamate, 3% of formaldehyde, and 5.1% of DAC. After cure wash, and dry as in Example 8, the add-on was found to be 5.1%; wrinkle recovery angles were 278° (conditioned) and 269° (wet).

EXAMPLE 10

A sample of cotton twill was treated in a pad bath containing 20% of dimethylolurea, 7.0% of DAC, and 73% water; the fabric was cured, without drying, at 125° C. for 20 minutes. It was laundered and tumble dried and found to have an add-on of 12%, a conditioned wrinkle recovery angle of 281°, and a wet wrinkle recovery angle of 285°.

EXAMPLE 11

A highly methylolated, highly methylated melamine reagent (15%) and DAC (7.1%) were dissolved in water and the solution was used to treat cotton printcloth. The procedure was that of Example 7. The results were add-on 11.2%, conditioned wrinkle recovery angle 291°, and wet wrinkle recovery angle 271°.

EXAMPLE 12

Dimethylolpropyleneurea (10%) and DAC (5.0%) were dissolved in water to provide the treating solution for cotton printcloth. After treatment as in Example 8, the add-on of the fabric was 7.0%, the conditioned wrinkle recovery 256°, and the wet wrinkle recovery 252°.

EXAMPLE 13

Dimethoxymethyluron was used as described in Example 6. The results were: add-on 6%, conditioned wrinkle recovery angle 266°, wet wrinkle recovery angle 246°.

EXAMPLE 14

An aqueous solution containing 6% of DMDHEU, 6% of trimethoxymethylmelamine, and 8% of DAC was applied to cotton twill by the pad-dry-cure process described in Example 8. The washed and dried fabric showed an add-on of 8.7%, conditioned wrinkle recovery angle of 296°, and wet wrinkle recovery angle of 285°.

EXAMPLE 15

A 4% aqueous solution of dimethylolurea containing 2% of DAC was applied to cotton printcloth which was padded with light pressure on the rolls. The results, after cure, laundering and drying as in Example 8, were add-on about 8%, conditioned wrinkle recovery angle 275°, wet wrinkle recovery angle 241°.

DMEU is not generally used in delayed-cure processes because some reaction occurs prematurely during the delay period when commercial acid catalysts are used. This results in unremovable wrinkles in the fabric. However, DMEU can be used in a delayed-cure process with DAC as the catalyst with little reaction occurring curing a delay period of 33 days (the limit of this test) as shown in Table II.

TABLE II
Results of delayed cure of DMEU on cotton catalyzed with DAC [1]

| Time delayed | Add-on (percent) | N (percent) | $CH_2O$ | Wrinkle recovery (W+F), degrees | |
|---|---|---|---|---|---|
| | | | | Conditioned | Wet |
| 0 days: | | | | | |
| Cured | 9.1 | 2.10 | 2.91 | 285 | 238 |
| Uncured | 0 | 0.08 | 0.01 | 165 | 162 |
| 11 days: | | | | | |
| Cured | 8.2 | 2.14 | 2.85 | 288 | 261 |
| Uncured | 0 | 0.25 | 0.23 | 173 | 171 |
| 22 days: | | | | | |
| Cured | 9.3 | 2.17 | 2.91 | 285 | 256 |
| Uncured | 1.6 | 0.41 | 0.51 | 179 | 185 |
| 33 days: | | | | | |
| Cured | 9.9 | 2.18 | 2.78 | 292 | 259 |
| Uncured | 2.7 | 0.63 | 0.82 | 175 | 191 |
| Control | | | | 180 | 146 |

[1] The padded samples were dried at 60° C. for 7 minutes and stored. At the end of the delay period each sample was cut in half. One half was cured at 160° C. for 3 minutes and washed. The other half was washed without curing.

The nitrogen increased from 0.08% at zero delay to 0.63% after 33 days delay. The increase in nitrogen and formaldehyde contents of uncured fabrics suggest that approximately 25–30% of reagent was bound after 33 days delay. Part of the increase in nitrogen during the delay periods was probably due to the reactions of DAC with cotton fabric upon drying at room temperature. During the delay periods, a small amount of reaction occurred between DMEU and cellulose as indicated by the presence of formaldehyde in the fabric. There was no increase in conditioned wrinkle recovery angle during the delay periods and only small increases occurred in the wet wrinkle recoveries.

The results obtained with DAC as a catalyst are in good agreement with the results reported by Soignet et al., for which the substrate was DEAE fabric in the hydrochloride form. A comparison of these results is shown in the figure.

Curves A and B show that little change occurred in the conditioned wrinkle-recovery angles with DAC and with DEAE hydrochloride substitutents as catalysts, respectively, upon storage without curing. Curves C and D show the increase in wrinkle-recovery angles which occurred upon storage without curing when H-7 and triethylamine hydrochloride respectively were used as catalysts. Curves E and F show the conditioned wrinkle-recovery angles resulting from delayed curing with DEAE-hydrochloride substitutents and with DAC as catalysts, respectively. There was essentially no change in the wrinkle-recovery angles of the fabric catalyzed with DAC upon delayed curing. However, there was a slight downward trend in the wrinkle-recovery angles of the DEAE hydrochloride cotton-catalyzed samples with delay in curing.

MMM has a tendency to polymerize within the fabric during the delay period when a latent acid catalyst is used. However, since DAC proved to be a highly efficient catalyst for this compound, it was of interest to determine the effect of delayed curing upon the reaction and fabric properties. The results are shown in Table III. The nitrogen content in the uncured fabrics rose from 0.06% at zero time to 0.23% after a delay period of 33 days.

LEGEND FOR THE FIGURE

Conditioned wrinkle-recovery angles in fabrics resulting from delayed-cure reactions of DMEU with cotton using DAC, H–7, triethylamine hydrochloride and DEAE hydrochloride substituents as catalysts.

Curve A—Delayed, uncured. with DAC as catalyst.
Curve B—Delayed, uncured, with DEAE-hydrochloride cotton as a built-in catalyst.
Curve C—Delayed, uncured, with H–7 as the catalyst.

TABLE III
Results of delayed cure of MMM on cotton catalyzed with DAC [1]

| Time delayed (days) | Add-on (percent) | N (percent) | $CH_2O$ (percent) | Wrinkle recovery (W+F) degrees | | Tear strength (g.) |
|---|---|---|---|---|---|---|
| | | | | Conditioned | Wet | |
| 0 days: Cured, uncatalyzed [2] | 2.00 | | | 203 | 189 | 793 |
| 0 days: | | | | | | |
| Cured | 5.86 | 1.85 | 1.32 | 251 | 232 | 727 |
| Uncured | 0.90 | 0.06 | 0.00 | 184 | 163 | 1,087 |
| 11 days: | | | | | | |
| Cured | 5.52 | 1.67 | 1.28 | 250 | 245 | 700 |
| Uncured | 1.03 | 0.13 | 0.03 | 188 | 171 | 1,060 |
| 22 days: | | | | | | |
| Cured | 6.31 | 1.76 | 1.30 | 261 | 252 | 633 |
| Uncured | 2.20 | 0.17 | 0.06 | 187 | 170 | 1,060 |
| 33 days: | | | | | | |
| Cured | 5.32 | 1.80 | 1.43 | 257 | 254 | 720 |
| Uncured | 1.46 | 0.23 | 0.14 | 185 | 172 | 1,153 |
| Control | | | | 189 | 165 | |

[1] The concentration of MMM in the pad bath was 5% and that of DAC was 0.25 M. The samples were dried at 60° C. for 7 minutes and stored. At the end of the delay period, each sample was cut in half. One half was cured at 160° C. for 3 minutes and washed. The other half was washed without curing.

[2] Fabric treated without delay as described in footnote 1 except that no catalyst was used.

Again in this case, some of the increase in nitrogen may be due to the reaction of DAC with the cotton cellulose. The formaldehyde values show that little reaction (ca. 10%) or polymerization occurred during the delay periods. The conditioned and wet wrinkle-recovery angles were essentially unchanged in the uncured samples but were equally as high in the delayed-cure samples as in the sample which was cured without delay. There was the usual drop in tear strength with curing and this was not affected by delaying the cure. The changes in wrinkle-recovery angles during the delay periods with catalyst H–7 and DAC on MMM-cotton were similar to those found for DMEU.

The following N-methylol reagents may be subjected to delayed-cure on cotton containing fabrics with results generally similar to those described above for DMEU- or MMM-treated fabrics: dimethylolpropyleneurea, dimethoxymethyluron, dimethyloldihydroxyethyleneurea, and methylated, methylolated melamines having more than three, and up to six, methoxymethyl units per mole of melamine. Thus, for example, when 10% of DMDHEU and 6.8% of DAC were applied to a sample of cotton printcloth, it was found that the resulting fabric showed equal or superior stability during storage compared to the corresponding DMEU-treated fabric (see above). On curing the DMDHEU-treated fabric after various periods of delay (and laundering and tumble drying the fabric), the results were to generate wrinkle recovery angles of approximately 280° (conditioned) and 260° (wet). The other N-methylol reagents mentioned in this paragraph, when subjected to delayed cure, showed stability comparable to or superior to that of the MMM-treated fabric and generated wrinkle recovery angles in the cotton fabrics similar to those described in the foregoing numbered examples which described cures without extensive periods of delay. The results of immediate cure or delayed cure are realized whether the fabric is 100% cellulosic (e.g., cotton) or is a blend (e.g., cotton/polyester).

Curve D—Delayed, uncured with triethylamine hydrochloride as catalyst.
Curve E—Delayed, cured, with DEAE hydrochloride substituents as built-in catalyst.
Curve F—Delayed, cured with DAC as catalyst.

We claim:
1. A process for the reaction of N-methylol reagents with cellulose which process comprises:
   (a) treating a cellulosic fabric with an aqueous solution containing from about 4 to 20 weight percent of an N-methylol reagent selected from the group consisting of dimethylolethyleneurea, dimethyloldihydroxyethyleneurea, trimethoxymethylmelamine, dimethylol methyl carbamate, a highly methylolated, highly methylated melamine, dimethylolpropyleneurea, dimethoxymethyluron and dimethylolurea and from about 2 to 14 weight percent of N,N-diethylaziridinium chloride,
   (b) curing the treated fabric from (a) at a temperature of about 125° C. to about 200° C. for a period of about 1 minute to about 20 minutes.
2. The process of claim 1 wherein the N-methylol reagent is dimethylolethyleneurea.
3. The process of claim 1 wherein the N-methylol reagent is dimethyloldihydroxyethyleneurea.
4. The process of claim 1 wherein the N-methylol reagent is trimethoxymethylmelamine.
5. The process of claim 1 wherein the N-methylol reagent is dimethylol methyl carbamate.
6. The process of claim 1 wherein the N-methylol reagent is a highly methylolated, highly methylated melamine.
7. The process of claim 1 wherein the N-methylol reagent is dimethylolpropyleneurea.
8. The process of claim 1 wherein the N-methylol reagent is dimethoxymethyluron.
9. The process of claim 1 wherein the N-methylol reagent is dimethylolurea.

(References on following page)

References Cited

Rowland et al., Textile Research Journal, 39, 530–542 (1969).

Roberts et al., Textile Research Journal 41, 617–620 (1971).

Roberts et al., Carbohydrate Research 17, 393–399 (1971).

Roberts et al., Textile Research Journal 41, 710–712 (1971).

GEORGE F. LESMES, Primary Examiner

J. CANNON, Assistant Examiner

U.S. Cl. X.R.

8—115.7, 115.5, Dig. 10; 260—91.3 VA, 231 A